US009229229B2

(12) United States Patent
Hervy et al.

(10) Patent No.: US 9,229,229 B2
(45) Date of Patent: Jan. 5, 2016

(54) DISPLAY DEVICE, IN PARTICULAR FOR A MOTOR VEHICLE

(75) Inventors: Sébastien Hervy, La Garenne Colombes (FR); Nicolas Louviaux, Parnes (FR); Jean-Christophe Jolyvuillemin, Pontoise (FR)

(73) Assignee: Johnson Controls Automotive Electronics SAS, Cergy-Pontoise (FR)

( * ) Notice: Subject to any disclaimer, the term of this patent is extended or adjusted under 35 U.S.C. 154(b) by 54 days.

(21) Appl. No.: 14/239,133

(22) PCT Filed: Aug. 17, 2012

(86) PCT No.: PCT/EP2012/003503
§ 371 (c)(1),
(2), (4) Date: Jul. 1, 2014

(87) PCT Pub. No.: WO2013/023792
PCT Pub. Date: Feb. 21, 2013

(65) Prior Publication Data
US 2014/0354705 A1 Dec. 4, 2014

(30) Foreign Application Priority Data

Aug. 18, 2011 (DE) .......................... 10 2011 111 015
Nov. 4, 2011 (FR) ........................................ 11 03347

(51) Int. Cl.
*G02B 27/01* (2006.01)
*G09G 3/18* (2006.01)
*G09G 3/34* (2006.01)

(52) U.S. Cl.
CPC .............. *G02B 27/0101* (2013.01); *G09G 3/18* (2013.01); *G09G 3/3426* (2013.01); *G02B 2027/0112* (2013.01); *G09G 2320/062* (2013.01); *G09G 2380/10* (2013.01)

(58) Field of Classification Search
CPC ................... G02B 27/0101; G02B 2027/0112; G09G 3/18; G09G 2320/062; G09G 2380/10; G02F 1/133514
See application file for complete search history.

(56) References Cited

U.S. PATENT DOCUMENTS 5,440,428 A 8/1995 Hegg et al.
7,034,778 B1 * 4/2006 Hahl ................................ 345/7
(Continued)

FOREIGN PATENT DOCUMENTS

DE   10 2009 046935 A1   5/2011
FR   2 929 017           9/2009
JP   10-133138           5/1998

OTHER PUBLICATIONS

International Preliminary Report on Patentability in PCT/EP2012/003503.
International Search Report issued in related International Patent Application No. PCT/EP2012/003503, completed Feb. 7, 2013.

*Primary Examiner* — Sanjiv D Patel
(74) *Attorney, Agent, or Firm* — Foley & Lardner LLP

(57) ABSTRACT

A display device, in particular for a motor vehicle, includes a projection module and a reflection element, the reflection element being designed to at least partially reflect an image from the projection module in a normal direction of vision of a user of the display device. The display module is a monochrome display module. The display device has a display area of a display module. The display area comprises a first part of the display area, the display area comprises a second part of the display area, and the display device has at least one light source. The display device is designed to display a first symbol in the first part of the display area and a second symbol in the second part of the display area.

10 Claims, 2 Drawing Sheets

(56) References Cited

U.S. PATENT DOCUMENTS

| | | | |
|---|---|---|---|
| 2005/0088434 A1* | 4/2005 | Potucek | 345/214 |
| 2006/0241821 A1* | 10/2006 | Hrabak et al. | 701/3 |
| 2007/0250391 A1* | 10/2007 | Prade et al. | 705/16 |
| 2007/0274102 A1* | 11/2007 | Bohme et al. | 362/616 |

\* cited by examiner

DISPLAY DEVICE, IN PARTICULAR FOR A MOTOR VEHICLE

The present application is a U.S. National Phase of PCT/EP2012/003503, filed Aug. 17, 2012, which claims priority from German Patent Application No. 10 2011 111 015.5, filed Aug. 18, 2011, and French Patent Application No. 11/03347, filed Nov. 4, 2011. The contents of these applications are incorporated herein by reference in their entirety.

The present invention relates to a display device, in particular for a motor vehicle.

Display devices of the HUD (Head Up Display) type are known, in particular with the projection of an image towards a windscreen as described in the document U.S. Pat. No. 5,214,413 or in the document WO 2007/090824 A1. It is advantageous if the projected image, of the head up display device, appears to have different colors.

A disadvantage of such devices according to the prior art consists in the fact that in order to produce such display devices, display modules having the possibility of displaying different colors are necessary. Such display modules have a relatively high price, which means that they are principally used for top of the range motor vehicles.

In particular, the purpose of the present invention is to alleviate the disadvantages of the prior art, in particular those mentioned above, and its purpose is also to propose a display device which is capable of displaying different symbols, perceptible by a user of the display device, the symbols appearing to have different colors whilst using a monochrome display module, that is to say a display module which does not intrinsically allow the display of different colors for a user of the display device.

According to the present invention, this purpose is achieved by a display device, in particular for a motor vehicle, comprising:
 a projection module and
 a reflection element, the reflection element being designed to at least partially reflect an image coming from the projection module in a normal direction of vision of a user of the display device,
 the display module being a monochrome display module,
 the display device having a display area of a display module,
 the display area comprising a first part of the display area,
 the display area comprising a second part of the display area,
 the display device having at least one light source, characterized in that the display device
 is designed to display a first symbol in the first part of the display area, and in that the display device
 is designed to display a second symbol in the second part of the display area,
 the first symbol appearing, to the user of the display device, to have a first color, and
 the second symbol appearing, to the user of the display device, to have a second color.

Due to such an embodiment of a display device, it is advantageously possible to reduce the costs associated with such a display device whilst producing, for a user of the display device, an impression of multi-color operation of the display device.

It is obvious to those skilled in the art that a greater number than two parts (first part of the display area and second part of the display area) of the display area can exist in the display device according to the present invention, which allows the display of a plurality of different symbols.

A preferred improvement of the invention is in the fact that the first part of the display area is the only place for the display of the first symbol, and that the second part of the display area is the only place for the display of the second symbol.

Due to such an embodiment of a display device, it is advantageously possible to permanently associate different symbols (normally having predetermined colors) with different parts of the display area.

A particularly preferred improvement of the invention is in the fact that the display module comprises, in the display area, a colored layer, the colored layer being provided, in the first display area, in a first color, and the colored layer being provided, in the second display area, in a second color.

Due to such an embodiment of a display device, it is advantageously possible to use a single light source back-lighting the first part of the display area as well as the second part of the display area whilst producing, for a user of the display device, different colors in the first part of the display area and in the second part of the display area.

Another preferred improvement of the invention is in the fact that the display device comprises a first light source, and the display device comprises a second light source, the first light source back-lighting a first part of the display area, the second light source back-lighting a second part of the display area.

Due to such an embodiment of the display device according to the present invention, it is advantageously possible to produce, for a user of the display device, different colors in the first part of the display area and in the second part of the display area, without having to define these colors by the intermediary of a colored layer which is colored with a first color in the first display area and with a second color in the second display area.

A particularly preferred improvement of the invention is in the fact that the first light source and the second light source differ with respect to the color of the light emitted and/or to the intensity of the light emitted.

Yet another particularly preferred improvement of the invention is in the fact that the first light source and/or the second light source are designed to be capable of changing the color of the light emitted and/or the intensity of the light emitted.

Due to such an embodiment of the display device according to the present invention, it is advantageously possible to produce, for a user of the display device, different colors in the first part of the display area and in the second part of the display area in a dynamic manner, that is to say by producing colors which change: during a first time interval, the symbol in, for example, the first part of the display area is displayed having a first color and, during a second time interval, the symbol in the first part of the display area is displayed having a second color (different from the first color). Thus, it is advantageously possible to transmit additional information to the user of the display device. For example, it is thus possible for a symbol (generally representing a petrol pump) to be displayed during a first time interval having a yellow color and (when fuel is continuously taken from the fuel tank of the motor vehicle without being replenished) this symbol is displayed, during the second time interval, having a red color (for example).

A particularly preferred improvement of the invention is in the fact that the display device comprises a display module of the liquid crystal display (LCD) type.

Another particularly preferred improvement of the invention is in that the first part and/or the second part of the display area corresponds to at least one segment of the liquid crystal display module.

A particularly preferred improvement of the invention is in the fact that the first part and/or the second part of the display area corresponds to a single segment of the liquid crystal display module.

Another preferred improvement of the invention is in the fact that the display device comprises a display module of the matrix type.

A particularly preferred improvement of the invention is in the fact that the reflection element is an element positioned at a distance with respect to a windscreen of the motor vehicle.

Yet another particularly preferred improvement of the invention is in that the reflection element is designed to be retractable between, on the one hand, a position of use of the reflection element and, on the other hand, a position of rest of the reflection element.

Other features and advantages of the invention will emerge on reading the following description of a particular and non-limiting embodiment of the present invention.

BRIEF DESCRIPTION OF THE DRAWINGS

The invention will be better understood by means of the following description, which relates to preferred embodiments, given by way of non-limiting example and explained with references to the appended diagram in which.

DESCRIPTION OF THE DRAWINGS

Figure 8:
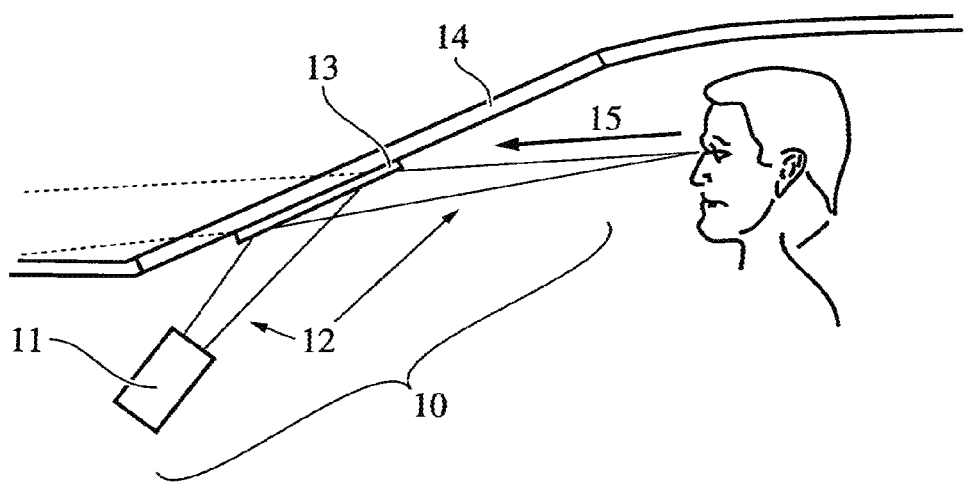
FIG. 8 is a diagrammatic cross-sectional view of a display device according to the present invention.

As shown in FIG. 8 of the appended drawing, a display device 10 according to the present invention comprises a projection module 11 which generates an image in the normal direction of vision 15 of a user of the display device 10 along an optical path 12. The optical path 12 comprises at least one reflection element 13. In this way, the optical path 12 can comprise a (single) reflection element, as shown in FIG. 8. Moreover, the optical path 12 can also comprise two reflection elements (not shown). The display device 10 can of course also comprise, in another variant not shown in the figures, more than two reflection elements 13.

The reflection element 13 can form part of the windscreen 14 of the vehicle. In another preferred variant of the invention, the reflection element 3 is an element positioned relatively close to the windscreen 14, as shown in FIG. 8. In another preferred variant of the invention (not shown in the figures) the reflection element 13 is an element positioned at a distinct distance with respect to the windscreen 14.

Preferably, the reflection element 13 can be designed to be retractable between, on the one hand, a position of use of the reflection element 13 and, on the other hand, a position of rest of the reflection element 13.

The normal direction of vision 15 is the direction of view of a user of the display device 10, in particular a vehicle driver, when the latter is looking, in particular through the windscreen 14, at what is outside of the vehicle, for example at what is in front of the vehicle.

The display device 10 according to the invention comprises, preferably in the projection module 11, a display module that is a monochrome display module. The display module can be a display module of the liquid crystal display (LCD) type. Moreover, the display module can also be a display module of the matrix type. It is also possible, according to the present invention, to combine a liquid crystal display (LCD) module with a display module of the matrix type, that is to say to use a combined display module comprising a part of the liquid crystal display module and a part of the matrix display module. According to the present invention, in the case of a display module of the matrix type, it is preferable to use a display module of the passive matrix type.

The display device 10 (and thus the display module) comprises a display area which comprises a first part of the display area and a second part of the display area. The display device 10 comprises at least one light source and makes it possible to display a first symbol in the first part of the display area and a second symbol in the second part of the display area, the first symbol appearing, to the user of the display device, to have a first color and the second symbol appearing, to the user of the display device, to have a second color.

According to a first embodiment, this functionality can be achieved by using a single light source for the first part of the display area and the second part of the display area by the intermediary of a colored layer in the display area, the colored layer being provided, in the first display area, with a first color and the colored layer being provided, in the second display area, with a second color. The colored layer can be produced, for example, by the intermediary of a printed pane or film.

According to a second embodiment of the present invention, this functionality can also be achieved using a first light source and a second light source, the first light source back-lighting the first part of the display area and the second source back-lighting the second part of the display area.

According to yet another embodiment of the present invention, this functionality can also be achieved by combining the first embodiment with the second embodiment, that is to say by the intermediary of a colored layer in the first display area, the colored layer being provided with a first color in the first display area and the colored layer being provided with a second color in the second display area, and by using a first light source and a second light source, the first light source back-lighting the first part of the display area and the second light source back-lighting the second part of the display area.

It is obvious that white light is considered to be "a color" of the light emitted by the light source or by one of the light sources just as are other colors such as yellow, red, blue, green, etc.

FIGS. 1 to 7 are diagrammatic representations of different views of the content displayed by a display device according to the present invention.

Figure 1:
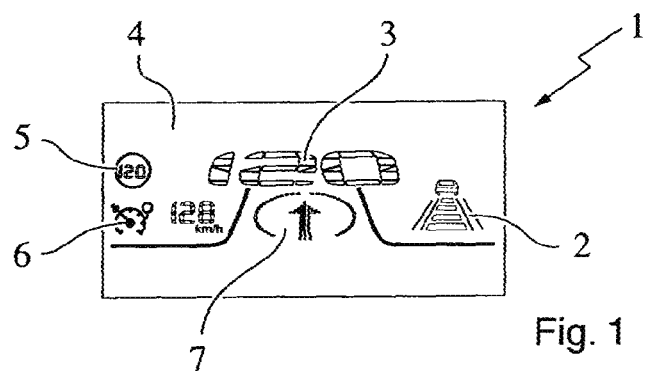
FIGS. 1 to 7 are diagrammatic views of the content of the information displayed by a display device according to the present invention.

FIG. 1 shows a first example of a view produced by a display device 10 according to the present invention for a user, in particular the driver of a motor vehicle. For example, the display device 10 comprises a display module of the liquid crystal display (LCD) type which is covered by a pane (in particular a glass pane). The liquid crystal display (LCD) module is back-lit by means of at least one light source, preferably by means of several light sources, in particular one or more light emitting diodes (LED) or again one of more organic light emitting diodes (OLED). In the example shown, the display area comprises six different parts, that is to say a first part 2 of the display area, a second part 3 of the display area, a third part 4 of the display area, a fourth part 5 of the display area, a fifth part 6 of the display area, and a sixth part 7 of the display area. In the example shown, each of the parts 2, 3, 4, 5, 6, 7 of the display area is back-lit by the intermediary of at least one light source, in particular a light emitting diode (LED), and in particular in a colored way. The second and sixth parts 3, 7 of the display area, displaying in this example the momentary speed and an item of information from a navigation system, are back-lit with white light, and it is a matter of a display module or several display modules of the matrix type, in particular of the passive matrix type. The first, third, fourth and fifth parts 2, 4, 5, 6 of the display area are back-lit with non-white light (yellow/orange, red, green).

Figure 2:
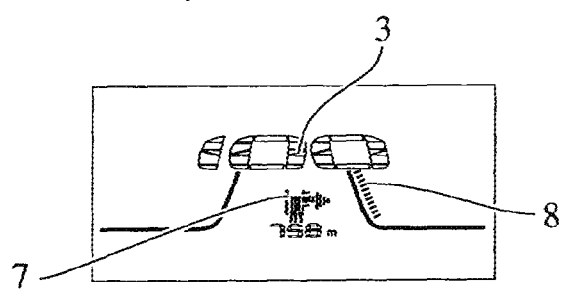

In the example shown in FIG. 2, additional parts 8, 9 of the display area are shown. This is a matter of a display module of the matrix type, in particular of the passive matrix type, in particular displaying items of information from the navigation system in a yellow/orange color.

Figure 3:
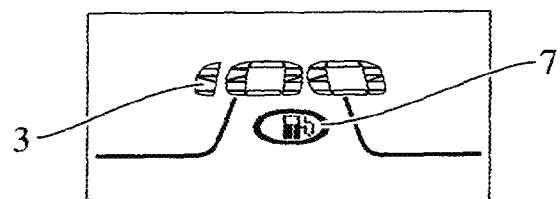

In the example shown in FIG. 3, in the sixth part 7 of the display area there is displayed an item of information on the operational state of the motor vehicle, in this example the need to take on petrol.

Figure 4:
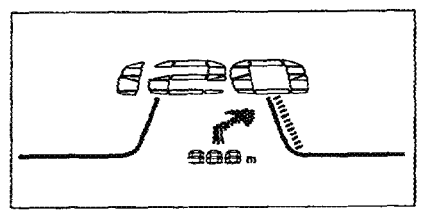

In the examples shown in FIGS. 2 and 4, the momentary speed of the motor vehicle is shown, in particular by means of a bar chart, also in the additional part 8 of the display area. In such a bar chart, the length of the bars (or the number of identical bars succeeding one another) gives an indication of the momentary speed of the motor vehicle.

Figure 5:
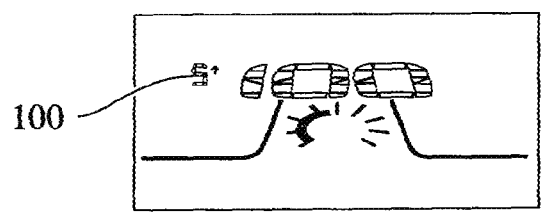

In the example shown in FIG. 5, another additional part 10 of the display area is shown, in particular displaying an item of information from the information and entertainment system.

Figure 6:
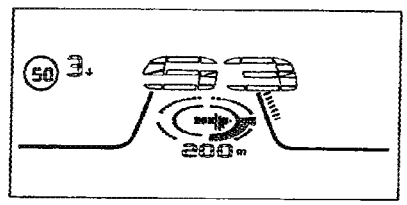
Figure 7:
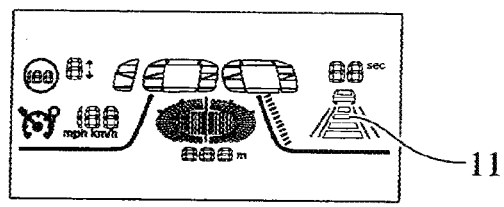

In the examples shown in FIGS. 6 and 7, other examples of the display device 10 according to the present invention are shown, in particular with another additional part 11 of the display area, by means of which yet other items of information can be displayed.

The invention claimed is:

1. A display device, comprising:
a projection module; and
a reflection element, the reflection element being designed to at least partially reflect an image coming from the projection module in a normal direction of vision of a user of the display device,
the display device to have a display area of a display module,
the display module being a monochrome display module,
the display area comprising a first part of the display area,
the display area comprising a second part of the display area,
the display device having at least one light source,
wherein the display device comprises a first light source, and the display device comprises a second light source, the first light source back-lighting the first part of the display area, the second light source back-lighting the second part of the display area,
wherein the display device is designed to display a first symbol in the first part of the display area, and in that the display device is designed to display a second symbol in the second part of the display area,
the first symbol appearing, to the user of the display device, to have a first color, and
the second symbol appearing, to the user of the display device, to have a second color;
wherein at least one of the first light source or the second light source is designed to be capable of changing the color of the light emitted; and
wherein the display module is of the passive matrix type, wherein during a first time interval, the first symbol displayed in the first part of the display area has a first color and, during a second time interval, the first symbol in the first part of the display area is displayed having a second color, wherein the second color is different from the first color, wherein the first time interval and the second time interval are based on a condition represented by the first symbol.

2. The display device as claimed in claim 1, wherein the first part of the display area is the only place for the display of the first symbol, and the second part of the display area is the only place for the display of the second symbol.

3. The display device as claimed in claim 1, wherein the display module comprises, in the display area, a colored layer, the colored layer being provided, in the first display area, in a first color, and the colored layer being provided, in the second display area, in a second color.

4. The display device as claimed in claim 1, wherein the first light source and the second light source differ with respect to at least one of the color of the light emitted or the intensity of the light emitted.

5. The display device as claimed in claim 1, wherein at least one of the first light source or the second light source is designed to be capable of changing the intensity of the light emitted.

6. The display device as claimed in claim 5, wherein the first light source and the second light source differ with respect to the color of the light emitted and/or to the intensity of the light emitted.

7. The display device as claimed in claim 1, wherein the display device comprises a display module of the liquid crystal display (LCD) type.

8. The display device as claimed in claim 1, wherein the first part and/or the second part of the display area corresponds to at least one segment of the liquid crystal display module.

9. The display device as claimed in claim 1, wherein the display device comprises a display module of the matrix type.

10. The display device as claimed in claim 1, wherein the reflection element is an element positioned at a distance with respect to a windscreen of the motor vehicle.

* * * * *